(12) United States Patent
Tiainen et al.

(10) Patent No.: US 6,674,722 B1
(45) Date of Patent: Jan. 6, 2004

(54) PROCESSES IN A DISTRIBUTED MULTIPROCESSOR SYSTEM

(75) Inventors: Risto Tiainen, Espoo (FI); Jari Rautiainen, Espoo (FI); Pekka Tonteri, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/367,147
(22) PCT Filed: Feb. 24, 1998
(86) PCT No.: PCT/FI98/00161
§ 371 (c)(1),
(2), (4) Date: Nov. 30, 1999
(87) PCT Pub. No.: WO98/38770
PCT Pub. Date: Sep. 3, 1998

(30) Foreign Application Priority Data

Feb. 25, 1997 (FI) .................................................. 970784

(51) Int. Cl.$^7$ ............................................... H04L 12/56
(52) U.S. Cl. ..................................................... 370/236
(58) Field of Search ............................. 370/229, 236, 370/236.1, 236.2, 442, 443; 700/1, 2; 709/200, 201, 202, 203, 204, 205, 206, 207, 232, 233, 234, 235; 712/200, 201, 202, 203

(56) References Cited

U.S. PATENT DOCUMENTS

| | | | |
|---|---|---|---|
| 4,475,192 A | | 10/1984 | Fernow et al. |
| 5,453,982 A | | 9/1995 | Pennington et al. |
| 5,737,535 A | * | 4/1998 | Bagley et al. ............... 709/227 |
| 5,781,533 A | * | 7/1998 | Manning et al. ............ 370/236 |
| 5,852,602 A | * | 12/1998 | Sugawara .................. 370/235.1 |
| 6,032,272 A | * | 2/2000 | Soirinsuo et al. ........... 714/706 |
| 6,078,565 A | * | 6/2000 | Ben-Michael et al. ...... 370/236 |
| 6,347,337 B1 | * | 2/2002 | Shah et al. .................. 709/224 |
| 6,388,992 B2 | * | 5/2002 | Aubert et al. ............... 370/232 |

FOREIGN PATENT DOCUMENTS

GB  2 226 738  7/1990

OTHER PUBLICATIONS

IEEE Network, vol. 9, No. 2, Mar. 1995, New York, Kung et al., "Credit–Based Flow Control for ATM Networks", pp. 40–48.
International IFIP–IEEE Conference on Broadband Communications . . . , Volume Apr. 1996, London, Khorsandi, "A minimal–buffer loss–free flow control protocol for ATM networks", pp. 161–172.

* cited by examiner

Primary Examiner—Chi Pham
Assistant Examiner—Keith George
(74) Attorney, Agent, or Firm—Squire, Sander & Dempsey L.L.P.

(57) ABSTRACT

The invention relates to a method for controlling the flow of data messages exchanged between asynchronous digital stack processes in an unreliable distributed multiprocessor system, such as an SDH (Synchronous Digital Hierarchy) node. In accordance with the invention, the inter-process flow control algorithm is based on a credit mechanism. According to that mechanism, a sending process (P1) must receive credit from the receiving process (P2, P3, P4) before the sending process (P1) can send messages (Q) to the recipient. The sending process (P1) uses in the account (account P2, account P3, account P4) of each receiving process the process's own pool (V2, V3, V4) and, in addition, a common pool (Y1) for all the receiving processes, so that a pool at each given moment represents the unused amount of credit obtained from the receiving processes (P2, P3, P4) and so that the free portion in the pool indicates how much there is room left in the message buffer for messages (Q) sent to the receiving process.

9 Claims, 2 Drawing Sheets

PROCESSES IN A DISTRIBUTED MULTIPROCESSOR SYSTEM

BACKGROUND OF THE INVENTION

1. Field of the Invention

This invention relates to a method for controlling the flow of data messages exchanged between asynchronous digital stack processes in an unreliable distributed multiprocessor system. In addition, the invention relates to the use of the method in an SDH node.

2. Description of the Related Art

To better understand the background of the invention let us consider the block diagram in FIG. 1 showing part of an SDH (Synchronous Digital Hierarchy) node. Shown here by way of example is a node of the Synfonet system from Nokia Telecommunications. The Synfonet node is a configurable network element which for synchronous transport module STM-1/STM-4 connections can be configured into a terminal multiplexer (TM), add & drop multiplexer (ADM), digital cross-connect (DXC) and regenerator (REG). The node is a small unit to which various types of electrical and optical interface units and switch elements can be connected as plug-in units. The configuration can be changed from a simple SDH application to part of large SDH networks by adding and removing plug-in units. The processing capacity of the node is distributed so that all plug-in units have microprocessors of their own and the software as well as the configuration data can be distributed between multiple units, which adds to the reliability and processing capacity of the system. For network management (Telecommunication Management Network, TMN) and local management the node has an internationally standardized (ITU-T) Q3 interface. The internal Q3 application in the node as well as the inter-node control channels use IS-IS routing (Intermediate System to Intermediate System routing information exchange protocol for use in conjunction with ISO 8473). The IS-IS protocol is distributed in the system so that all protocol parts are not duplicated in every interface, but some common parts are centralized.

In the Open Systems Interconnection (OSI) model it is possible to manage connections between multiple applications. This means that even if there is only one physical connection between different processes, the connection still may simultaneously serve several parallel transmission services of the applications. The OSI model specifies different layers. The lowest layer (1, Physical Interface) defines the properties of the transmission means. The second layer (2, Data Link; Link-level Logical Interface) defines the end-to-end properties of the connection. The third layer (3, Network; Multi-channel Logical Interface) realizes efficient application of the data link layer (2) e.g. in such a manner that it divides the data link into multiple channels. The next layers are: 4, Transport; 5, Session; and 6, Presentation. The application layer (7, Application; Application Oriented Services) defines the characteristics of the system visible to the user.

FIG. 1 shows blocks of an SDH node. The central block 10 represents centralized and common units (CU) in the node, which include, among others, the node's timing and control units. The CU block realizes functions of different layers, centralized part 1 (CP), upper layers of the communications protocol 2 (symbolically OSI layers 4 to 7), distributed parts 3 (DP, symbolically OSI layers 1 to 3), and drivers 4 (Ethernet driver) for connecting to control systems, for example. The central block further includes optional application software 5 (ASW). Connection blocks 20, 30, 40 (STM-1) are examples of functional interfaces in the node that may be optical or electrical wire connections (or interface units STM-4, TU-12, etc.). They include one or more distributed parts 21, 23, 24 (DP, layers 1 to 3) and HDLC drivers 22. The number of distributed parts 21, 23, 24 varies according to the requirements of the application. The elements of the central part 10 and the distributed elements 20, 30, 40 are connected through a local bus B.

The node described above provides an example of a system located physically in one place. However, as regards the invention, it can just as well be thought that the bus B interconnects nodes and related distributed elements within a wider area. Then the bus can be physically realized in different ways known to a person skilled in the art.

In the SDH system described above, the software stack in the Q3 protocol stack is distributed among several processes, e.g. in block CU and in blocks DP in the STM-1 units. Data communication between the software processes is controlled by means of flow control. In the case depicted in FIG. 1 the stack processes may be located in blocks CU and DP or in blocks within those blocks, and the processes are physically interconnected by bus B as was mentioned above.

The main function of flow control is to solve data communications problems between asynchronous processes as there may occur situations in which a receiving process is not able to handle the incoming messages quickly enough. Then the process should have a chance to indicate that it cannot at that moment receive new messages but the sending process has to wait until the receiving process has first processed the old messages. In other words, the receiving process must be able to indicate that it is in restraint state. Furthermore, there are situations in which the sending process has a higher priority than the receiving process so that the receiving process cannot refuse new messages even if it could not handle all the messages. Flow control is to ensure that such problems, or restraint states, will not occur but messages are sent to processes only when they can process the messages appropriately.

In general, flow control should be able to provide answers to the following questions:
 when will restraint state occur?
 how can restraint state be indicated?
 what kind of measures should be taken in restraint state?
 how to delay the occurrence of restraint state for as long as possible?
 how to return to normal state from restraint state?

In the situation depicted in FIG. 1, flow control is needed in the following cases:

1) Between IS-IS distributed part and centralized part (DP-CU);
2) Between IS-IS distributed parts (DP-DP);
3) Between distributed part (DP) and upper layer process (OSI layers 4 to 7);
4) Between distributed part 3 and Q3 Ethernet driver 4, but only from Ethernet driver 4 to distributed part 3;
5) Between application software ASW and upper layer 2 (OSI layers 4 to 7) processes.

Interface specific flow control is applied to the last two items 4) and 5) since these represent an interface between the stack and other processes. The first three items 1) to 3) represent flow control between stack processes and, as regards flow control, a common approach can be applied to these processes. This invention relates to the flow control in situations represented by items 1), 2) and 3).

Distributed IS-IS parts may physically be located in different units, such as blocks STM-1 and DP in FIG. 1, for example. The number of units and processes cannot be determined in advance since the physical equipment is continually expanded and modified during its life-span. This sets special requirements on the flow control mechanism, and as the amount of RAM reserved for flow control is limited it has to be possible to determine the number of queued messages in run time. There is RAM e.g. in all blocks CU and DP shown in FIG. 1, some blocks even have it several megabytes, but normally only a few dozens (or only a few) kilobytes are reserved for flow control.

BRIEF SUMMARY OF THE INVENTION

The flow control problems mentioned above are solved according to the invention as characterized by claim 1. Dependent claims describe preferred embodiments of the invention. The invention is advantageously applied in an SDH node.

In accordance with the invention, a so-called credit mechanism is chosen as the flow control algorithm between processes. This means that the sending process has to receive credit from the receiving process before it can send messages to the recipient. To that end, the receiving process at first "owns" a certain amount of credit corresponding to the capacity of the receiving process in question, and it distributes the credit, or the capacity, to other processes. In other words, the sending process cannot send messages to the receiving process without a permission from the latter.

BRIEF DESCRIPTION OF SEVERAL VIEWS OF THE DRAWINGS

The invention will now be described in more detail with reference to the accompanying drawing wherein.

DETAILED DESCRIPTION OF THE INVENTION

The following requirements, for example, can be set on the flow control mechanism:

A process must have a certain amount of credit which the process passes to other processes. The amount of credit is defined in connection with the compilation of the program.

The total amount of credit in the system depends on the amount of RAM available to the system.

Credit inquiries and credit allocation are carried out using special messages such as flow control messages.

Flow control messages are received as normal incoming messages, so they are not given "a higher priority".

When a process wants to send a message to another process, it must first ask for credit from the recipient unless it has credit left for that recipient or it if it has not yet received any credit from that recipient.

Processes can buffer messages when waiting for credit but the amount of memory for buffering is limited.

If messages inside the stack process are buffered, it may be reflected in the restraint state of the process.

If a receiving process ends up in a situation in which it can give no more credit, it will send zero credit to all requesters so that the sending processes will know that the receiver is in restraint state.

Each process keeps track of the credits granted as well as of the credits received by it.

When a process receives credit from another process it deletes previous credit from that particular process if there is any left and from there on only uses the new credit.

Every time a credit message is received, a list of received credits is updated. A list of credits granted is updated when a credit message is sent.

A restraint situation is avoided for as long as possible by using message buffering in the processes.

The structure and functioning of the flow control algorithm will be now described in more detail. The inter-process credit mechanism is byte-based, i.e. the amount of credit directly indicates the total number of bytes of messages that can be sent to the process that granted the credit. So the sending process knows how long a message it can send to another process without requesting new credit. On the other hand this means that the maximum length of messages between processes has to be known in advance so that it is possible to determine the amount of credit granted to a requesting process, and the amount of credit always has to be greater than or equal to the maximum length of one message.

Every process has an account for each of the processes it communicates with. An important variable in an account is the size of the account's "own pool" for queued messages. In addition, all accounts of a process belong to a common pool wherefrom the accounts can "borrow" space if the receiving process's own pool is full.

Figure 1:
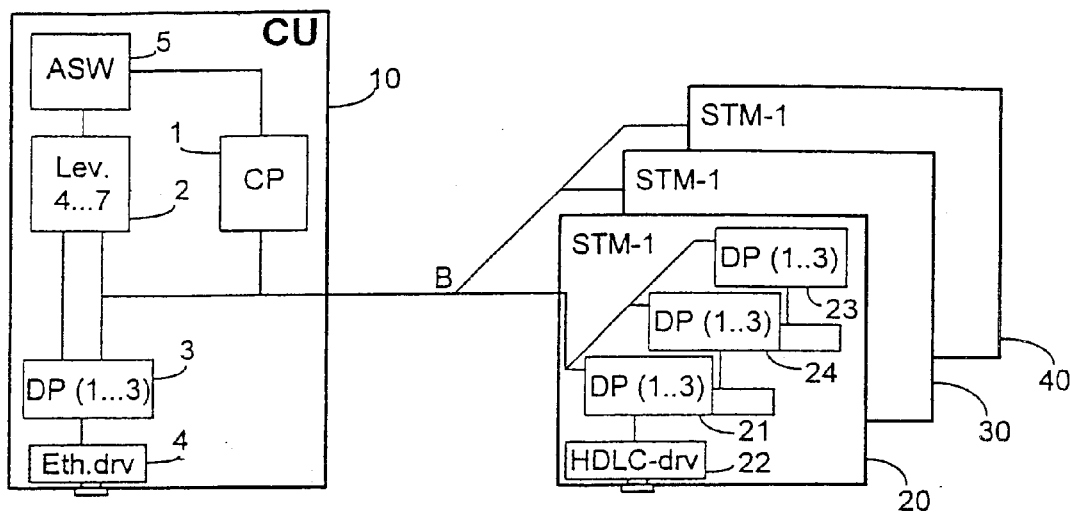
FIG. 1 shows Q3 stack processes in an SDH node the structure and functioning of which were described above.
Figure 2:
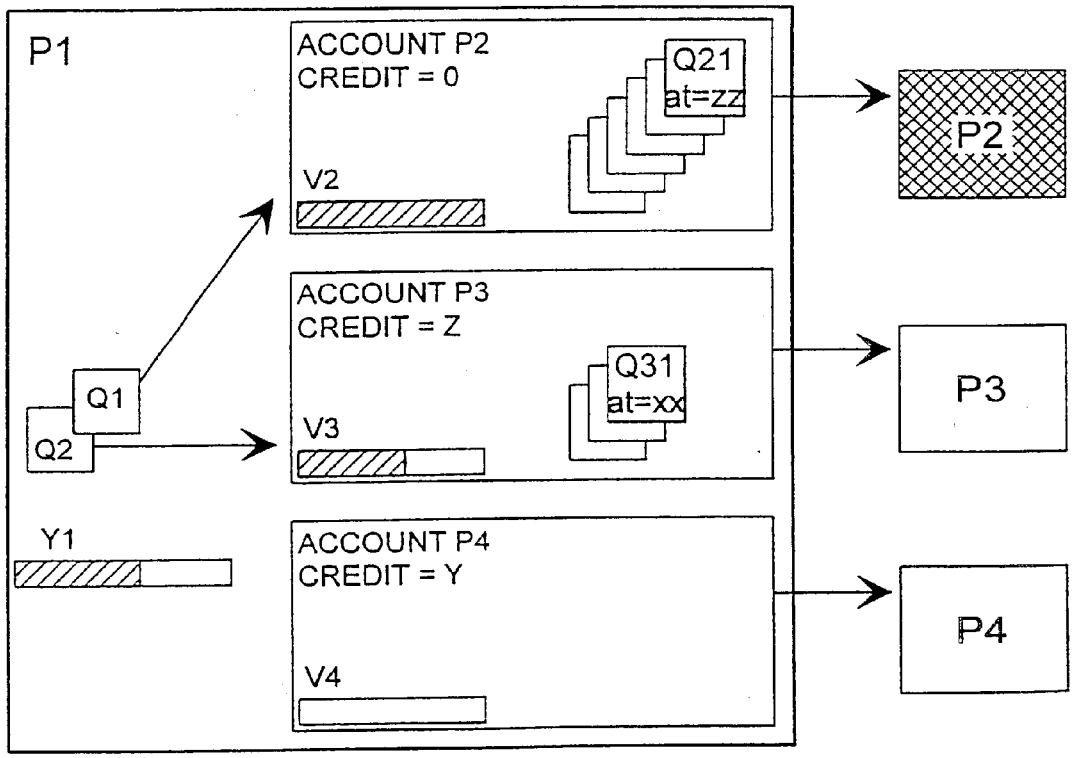
FIG. 2 shows an arrangement according to the invention in which a process has accounts for each process that receives messages.

FIG. 2 illustrates the above description using a diagrammatic example of the processes. FIG. 2 shows the accounts of process P1 and a situation in which data messages are sent to other processes P2, P3, P4. The Figure does not show the list kept by process P1 of credits granted to other processes.

Process P1 has messages Q to be sent. Messages Q1 and Q2 await processing. Queued messages Q21, etc. of process P2 have exhausted the credit granted to P2, credit=0. Thus, own pool V2 is also full, as indicated by the hatching. Messages in the send queue are in the order of arrival, as illustrated in the case of the first message Q21 by the arrival time at=zz. Messages to process P3 do not completely fill the buffer, so there is room left in own pool V3, and there is also credit left as indicated by sum Z. Messages in the send queue are also here in the order of arrival, as illustrated in the case of the first message Q31 by the arrival time at=zz. There are no messages for process P4, so own pool V4 is empty and the credit left is Y. The common pool Y1 of process P1 is also only partly filled. To fit a new message Q1 for process P1 in the send queue, it is possible to "borrow" pool space for account P2 from the common pool Y1 when own pool V2 is full.

FIG. 2 does not show the list kept by process P1 of the credits it has granted to other processes from which it will receive messages.

Figure 3:
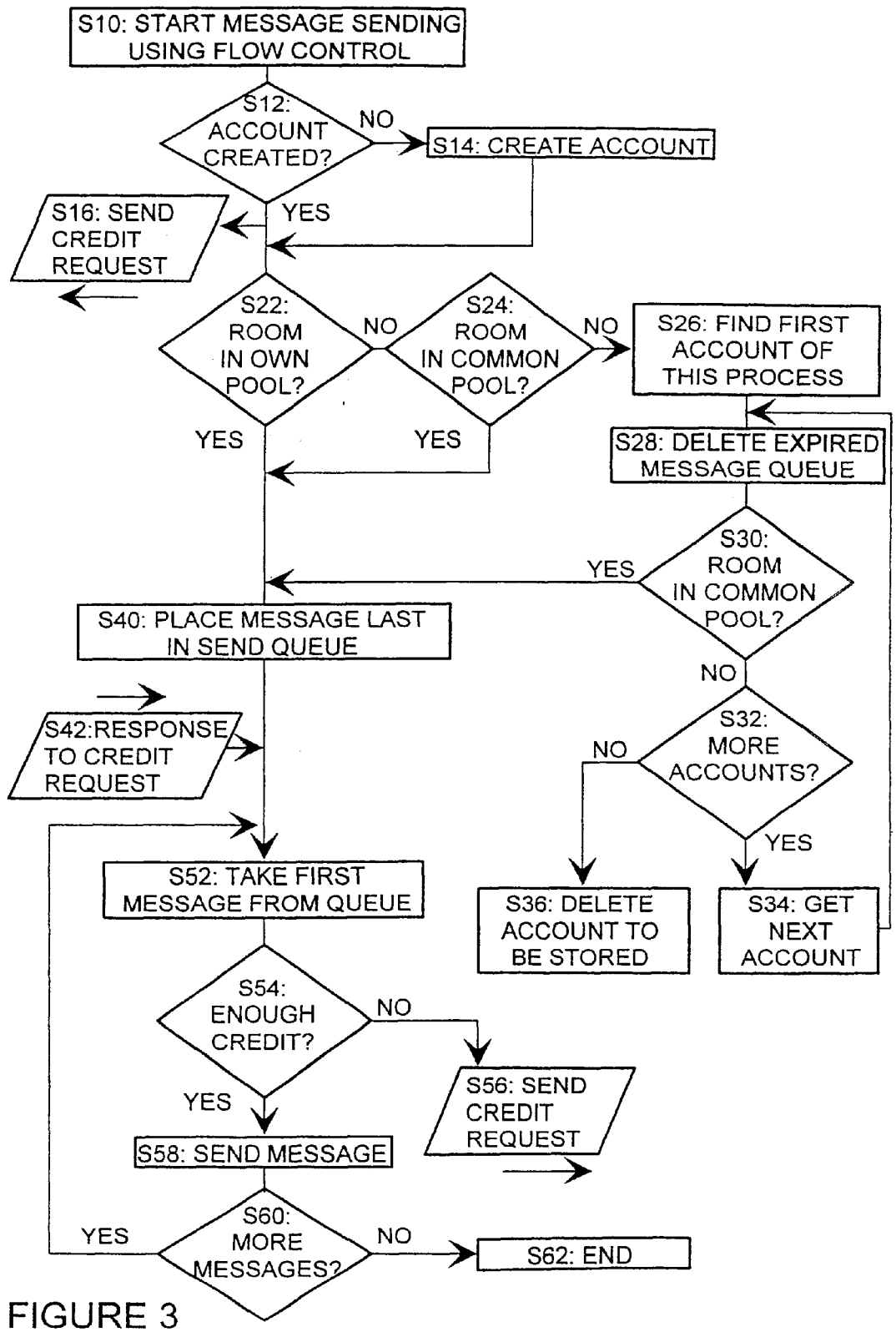
FIG. 3 shows in the form of flow diagram an example of the realization of the method according to the invention.

Flow control according to the invention is described in more detail by means of the flow diagram shown in FIG. 3. When a process wants to send a message to another process, step S10, it first checks if it has an account for the receiving process, step S12. If the sending process does not have an account for the receiving process, it creates an account for the recipient, step S14, and sends a credit request to the recipient, step S16, stores the data in the message to be sent and starts waiting for the credit response.

An account contains all the necessary information about the recipient. When a credit response message has been received, the account is updated with the new credit amount and the messages are sent from the queue. If the credit runs out while messages are being sent, the sending process requests more credit.

The sending of messages will be now considered in more detail. When waiting for a credit response message a process has to place the messages to the receiving process in a queue. This is straightforward if there is enough room in the message buffer of the process in which case the free space can be directly seen from the contents of own pool, as illustrated in FIG. 2. In other words, the process first checks if there is room in own pool, step S22. If there is, the message is placed in the queue, step S40, and the number of free bytes in the pool is decremented. If it is discovered in step S22 that the pool is full, the process may try and "borrow" room from the common pool, step S24. If there is no room left in the common pool, all accounts of the process in question are checked to see if there are messages too old in the message queues. This means that the message age limit is an adjustable system parameter. Messages too old may come into existence e.g. if the receiving process had been in another unit which was removed. If expired messages are found they are removed from the queue and the space freed is assigned to the common pool or, if the common pool was not used, to the process's own pool. First, in step S26, the first account of this process is found. If there are expired messages on this account they are deleted, step S28, and the freed memory space is assigned to the common pool. Then it is checked if there is now room in the common pool, step S30. If not, it is checked in step S32 if the process has other accounts. If there are more accounts, the next account is found, step S34, and execution returns to step S28. If there are no more accounts, the process moves on to step S36, in which the message to be stored is deleted. In other words, message queues are checked until space is found for the newest message or until all message queues have been checked. It should be noted that even if there had been expired messages to the receiving process in the message queue, the message queue will not be deleted since new messages, too, will be sent to it. So, if no space is found to store the newest message after the procedure described above, the whole message queue to the recipient is deleted. However, if in step S30 space is found in the common pool, operation moves on to step S40.

A rare possibility is that messages are lost between processes. Because of that, a new credit request is sent if no response has been received and a time period long enough has lapsed since the last request message. Said time period is an adjustable system parameter.

As regards reception of messages it can be stated that when a process receives data, the recipient has to update the account of the sending process. Because of this, the system does not have "wild" messages, i.e. messages outside the accounting system.

When a process receives a credit request, the receiving process first checks if it has an account for the sending process and, if necessary, creates a new account. After that, the recipient updates the account of the process requesting credit and sends a response message to the requesting process. If credit can be granted, the amount of credit granted will always be set to the maximum value, which is an adjustable system parameter. If no credit can be granted, the amount of credit in the response message will be zero. Granting of credit depends on the restraint state of the process, and the limit value for this state can be set by the operator through the user interface.

Next it will be considered the operation regarding the response message. When a response message to a credit request has been received, step S42, the receiver of the message, i.e. the sending process, updates the account of the sender of the message, and if the amount of credit is greater than zero, the message-sending process takes a message from the message queue, step S52. Messages are sent one at a time, and always before sending the process checks whether there is enough credit left, step S54. If in step S54 there was enough credit left, the message is sent, step S58. If in step S54 there is not enough credit left, the process sends a credit request and starts waiting for the credit response. In step S60 after the sending of a message it is checked whether the message buffer still contains messages to be sent. If it does, operation moves on to step S54. The operation continues in the loop until all the messages have been sent. When there are no more messages to be sent, the send operation is terminated in step S62.

If the response to a credit request contains zero credit, the information about this account is stored into a list of accounts unless the list already contains the account in question. This list is periodically checked and new credit requests are sent until a credit amount greater than zero is received as a response. The time period between credit requests depends on an adjustable system parameter.

Credit request and credit response messages are numbered in order to avoid the duplication of messages or disruption of the order of messages.

When a user sends messages using flow control, he is offered the following services/functions, for example:

sending of data using flow control;

flow control structure initialization, requested at process start-up (alternatively, flow control may be started dynamically, in which case the processes may start the flow control if necessary);

flow control structure reset in which all accounts and queues are deleted and structures are initialized;

chance to set the restraint state threshold values (threshold values can be set in a fixed manner upon system start-up or they can be changed dynamically during operation).

Above, the invention was described using an example of implementation and in relation to a certain SDH node. However, the invention can be applied to other equipment configurations as well and the applications can be modified within the scope of the claims set forth below.

What is claimed is:

1. A method for controlling a flow of data messages exchanged between asynchronous digital stack processes in a distributed multiprocessor system, wherein a flow control algorithm used is based on a credit mechanism in which a process (P1) sending messages (Q) requests by means of a credit request message credit from a receiving process (P2, P3, P4) in order to send messages to the receiving process (P2, P3, P4);

the receiving process (P2, P3, P4) grants by means of a response message to the requesting process (P1) an amount of credit which corresponds to the operational state of the capacity of the receiving process (P2, P3, P4); and the sending process (P1) sends messages to the receiving process (P2, P3, P4) if the credit granted was greater than zero, and said method being that pools are used for messages to be sent so that the sending process (P1) uses in an account (account P2, account P3, account P4) of each receiving process the process's own pool (V2, V3, V4) and, in addition, a common pool (Y1) for all receiving processes so that any pool at each given moment represents an unused amount of credit obtained from the respective receiving process or receiving processes (P2, P3, P4) and so that a free portion of the any pool indicates how much there is room in a message buffer for messages (Q) sent to the receiving process.

2. A method according to claim 1, characterized in that it comprises steps in which:

a) a process sending messages creates, if necessary, an account (S12, S14) for a receiving process;

b) the sending process sends (S16) to the receiving process a credit request message with which it requests an amount of credit from the receiving process;

c) the sending process places the messages to be sent in a message buffer to wait to be sent (S40);

d) on the basis of the credit request message the receiving process sends to the requesting process a response message (S42) containing the requested amount of credit if the receiving process has got the required capacity for handling of messages according to the amount of credit requested, or zero credit if the receiving process does not have the required free capacity;

e) the sending process updates the receiving process's account with the amount of credit contained in the credit response message (S50), takes messages from the message buffer (S52), and sends those messages taken from the message buffer (S58).

3. A method according to claim 2, characterized in that prior to step b):

a1) it is checked whether there is room in the own pool (V2, V3, V4) of the account of the receiving process (S22) and if there is, operation moves on to step b); but if there isn't, it is checked whether there is room in the common pool (Y1) and if there is, operation moves on to step b); but if there isn't:

a2) the first one of the other accounts of the receiving process is fetched (S26);

a3) if the account fetched includes expired messages, those messages are deleted (S28) and the amount of credit that corresponds to the deleted message queue is transferred into the common pool (Y1);

a4) whereafter it is checked whether there is room in the common pool (S30) and if there is, operation moves on to step b); but if there isn't, it is checked whether there are still other accounts (S32) and if there are, the next account is fetched (S34) and operations returns to step a3);

a5) but if there are no more accounts, the message is sent to be deleted (S36).

4. A method according to claim 2, characterized in that in step e) the receiving process, having taken a message from the message buffer (S52), also checks (S34) if the amount of credit left on the account of the receiving buffer is sufficient and if it is, the message taken from the buffer is sent (S58) but if the amount of credit isn't sufficient, a new credit request message is sent to the receiving process (S56); and in that after every message is checked (S60) whether there are still other messages to be sent in the buffer and if there are, operation returns to the beginning of step e), but if there are no more messages in the buffer, the sent operation is terminated (S62).

5. A method according to claim 1, characterized in that in connection with system start-up/compilation run a total amount of credit is specified for each process/program, from which total amount a process may allocate amounts of credit to other processes in credit response messages.

6. A method according to claim 1, characterized in that the credit request messages and credit response messages are flow control messages which are processed with the same priority as other transmitted messages.

7. A method according to claim 1, characterized in that the amount of credit directly indicates the total number of bytes in the messages that can be sent to the process that granted the credit.

8. A method according to claim 1, characterized in that each physically separate process has a maximum amount of credit specified during system start-up and keeps track of credit amounts granted by the process to other processes as well as of the free credit left.

9. A method according to claim 1 wherein the flow control algorithm is performed in an SHD (Synchronous Digital Hierarchy) node to control the flow of data messages.

* * * * *